United States Patent
Lacrouts-Cazenave et al.

(10) Patent No.: US 10,212,875 B2
(45) Date of Patent: Feb. 26, 2019

(54) FARM VEHICLE

(71) Applicant: TOUTI TERRE, Rumilly (FR)

(72) Inventors: Ivan Lacrouts-Cazenave, Saint Georges sur Loire (FR); Flore Lacrouts-Cazenave, Moye (FR)

(73) Assignee: TOUTI TERRE, Rumilly (FR)

( * ) Notice: Subject to any disclaimer, the term of this patent is extended or adjusted under 35 U.S.C. 154(b) by 3 days.

(21) Appl. No.: 15/550,566

(22) PCT Filed: Feb. 11, 2016

(86) PCT No.: PCT/FR2016/050316
§ 371 (c)(1),
(2) Date: Aug. 11, 2017

(87) PCT Pub. No.: WO2016/128685
PCT Pub. Date: Aug. 18, 2016

(65) Prior Publication Data
US 2018/0035599 A1    Feb. 8, 2018

(30) Foreign Application Priority Data
Feb. 13, 2015  (FR) ..................... 15 51174

(51) Int. Cl.
*A01B 75/00*   (2006.01)
*A01D 45/00*   (2018.01)
*B60N 2/02*    (2006.01)

(52) U.S. Cl.
CPC ............ *A01B 75/00* (2013.01); *A01D 45/001* (2013.01); *B60N 2/02* (2013.01); *B60N 2002/022* (2013.01); *B60N 2002/0212* (2013.01); *B60N 2002/0216* (2013.01)

(58) Field of Classification Search
None
See application file for complete search history.

(56) References Cited

U.S. PATENT DOCUMENTS 2,317,606 A * 4/1943 Harris .................... A01B 75/00
111/200
3,037,570 A * 6/1962 Olson .................... A01B 75/00
180/316

(Continued)

FOREIGN PATENT DOCUMENTS

FR    2123693    9/1972
FR    2862324    5/2005
GB    1342044   12/1973

*Primary Examiner* — Paul N Dickson
*Assistant Examiner* — Hilary L Johns
(74) *Attorney, Agent, or Firm* — Occhiuti & Rohlicek LLP

(57) ABSTRACT

A farm vehicle includes a seat that converts between sitting and kneeling positions. The seat has three cushions: a first one to support a user's chest and head, a second to supports his knees, and a central cushion that pivots transversely between a lowered position and a raised position. In the lower position, the third cushion supports the user's pelvis in the kneeling position. In the raised position, the third cushion forms a sitting part in a sitting position. The slide-way comprises a supporting slide-way that allows translation of the seat in a direction of travel. The seat is mounted on a base that pivots on the slide-way to allow the first, second, and third cushions to pivot about a vertical pivot axis of the farm vehicle.

12 Claims, 3 Drawing Sheets

(56) References Cited

U.S. PATENT DOCUMENTS

| | | | | |
|---|---|---|---|---|
| 3,361,224 A * | 1/1968 | McKim | A01B 75/00 180/65.6 |
| 3,976,155 A * | 8/1976 | Esch | E04F 21/22 280/32.5 |
| 4,458,784 A * | 7/1984 | Holmes, Jr. | A47C 16/00 182/129 |
| 4,526,248 A * | 7/1985 | Johansen | A01D 46/243 180/89.1 |
| 5,577,800 A * | 11/1996 | Earl, Jr. | A47C 9/005 297/174 R |
| 5,600,857 A * | 2/1997 | Heilmann | A61G 5/00 5/81.1 R |
| 5,762,402 A * | 6/1998 | Gillotti | A47C 9/005 297/338 |
| 6,425,590 B1 * | 7/2002 | Whiteside | B25H 5/00 280/32.5 |
| 6,824,149 B1 * | 11/2004 | Whitlock | B25H 5/00 280/32.6 |
| 6,969,077 B2 * | 11/2005 | Liu | B25H 5/00 280/30 |
| 7,367,623 B2 * | 5/2008 | Tholkes | A47C 9/005 297/300.8 |
| 7,481,438 B2 * | 1/2009 | Hernandez | B25H 5/00 280/32.5 |
| 7,887,136 B2 * | 2/2011 | Zoell | A47C 9/025 297/284.3 |
| 9,452,692 B1 * | 9/2016 | Rawlinson | B60N 2/062 |
| 9,962,307 B2 * | 5/2018 | Brinkerhoff | A61G 15/00 |
| 2005/0023780 A1 * | 2/2005 | Liu | B25H 5/00 280/32.6 |
| 2008/0093810 A1 * | 4/2008 | Liu | B25H 5/00 280/32.6 |
| 2010/0066042 A1 * | 3/2010 | Damouzehtash | A47C 9/005 280/32.5 |
| 2012/0169019 A1 * | 7/2012 | Grossberger | B62K 3/005 280/32.5 |
| 2015/0013060 A1 * | 1/2015 | Walters | A61G 7/1003 4/579 |
| 2015/0137574 A1 * | 5/2015 | Meyer | A47C 9/027 297/423.11 |
| 2016/0288910 A1 * | 10/2016 | Udriste | B64D 11/064 |
| 2017/0239515 A1 * | 8/2017 | Leong | A63B 22/14 |

\* cited by examiner

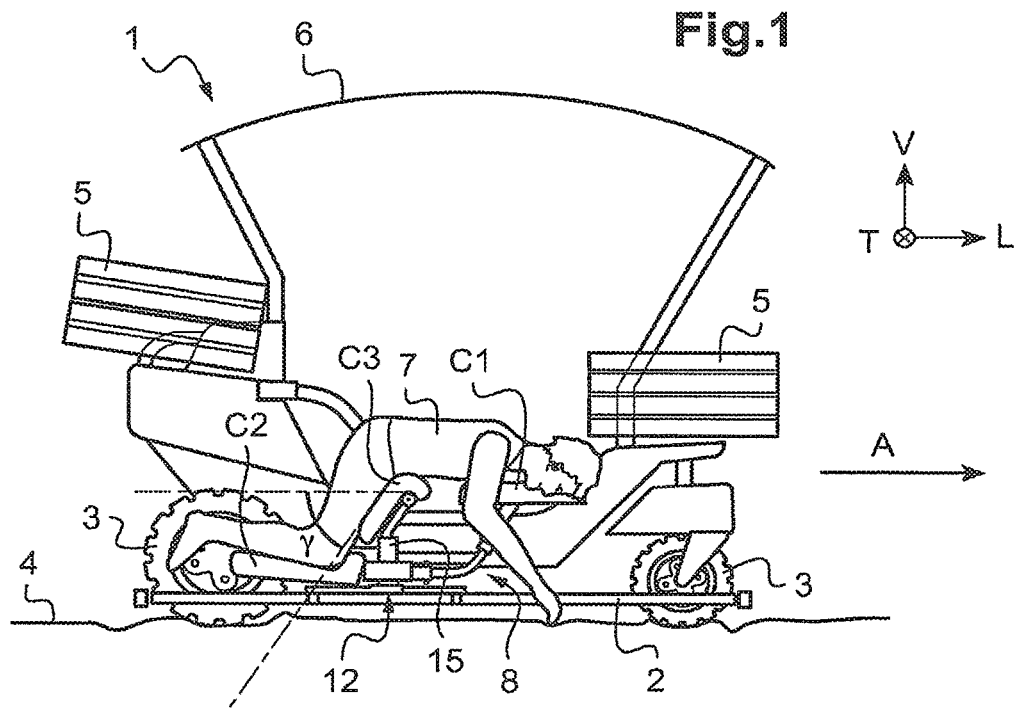
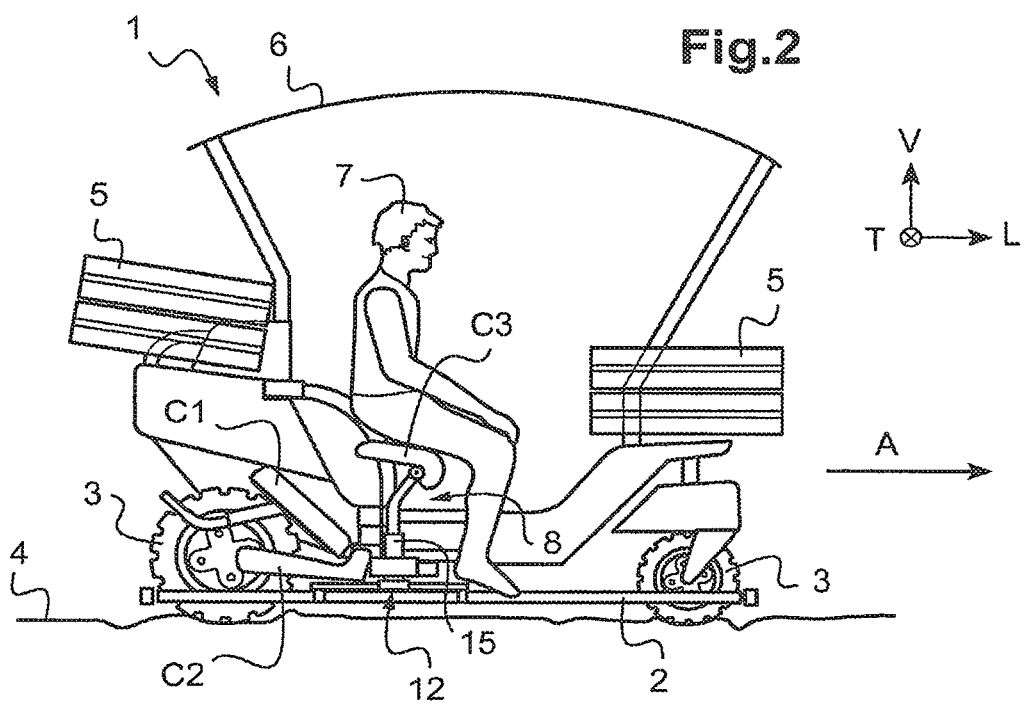

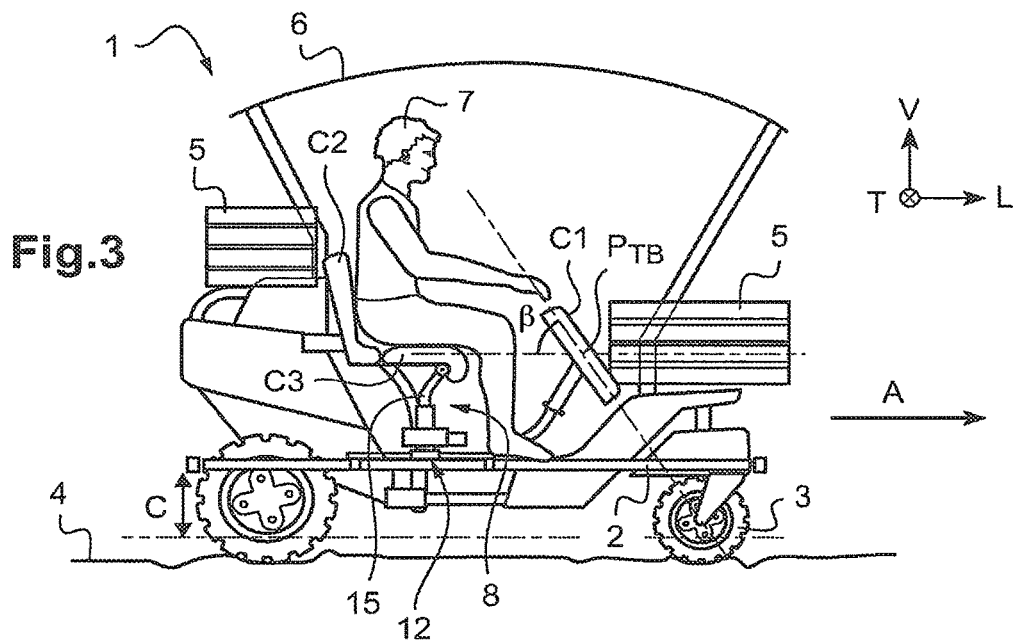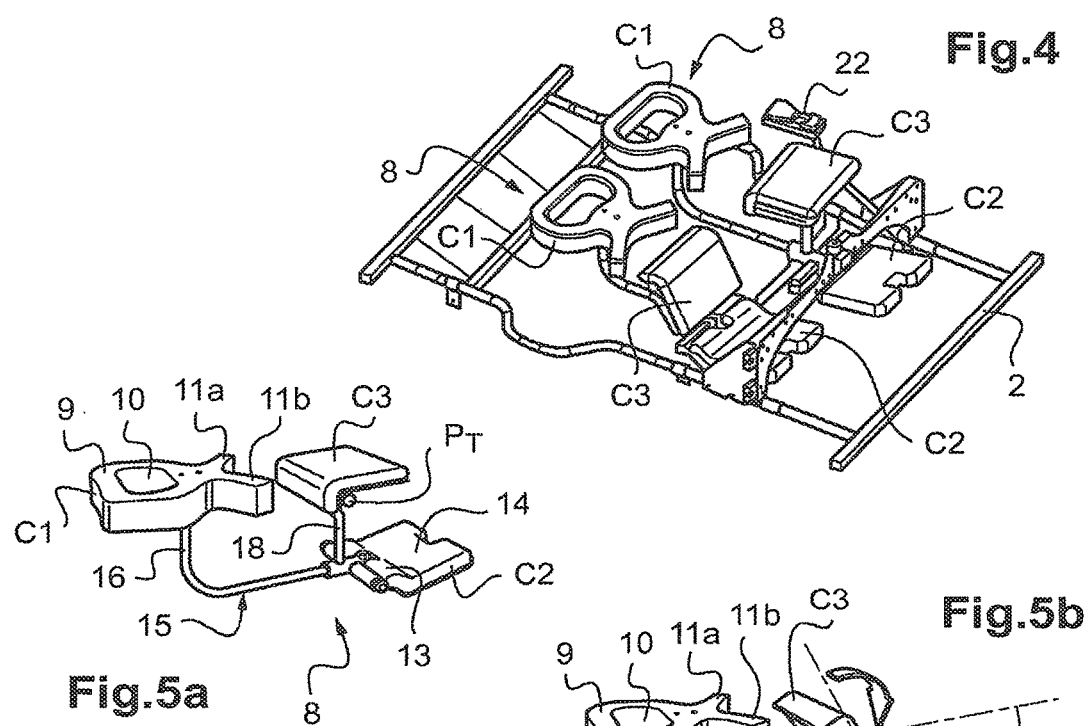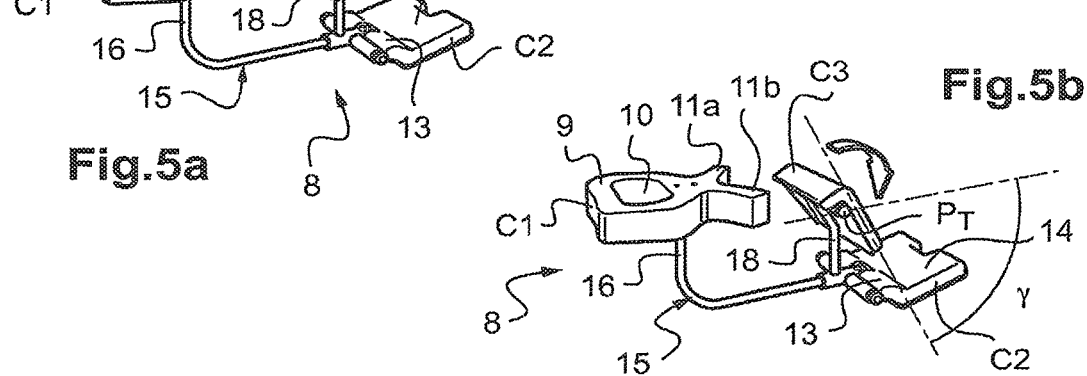

FARM VEHICLE

RELATED APPLICATIONS

This is the national stage of PCT/FR2016/050316, filed on Feb. 11, 2016, which claims the benefit of the Feb. 13, 2015 priority date of French application FR1551174, the content of which is herein incorporated by reference.

FIELD OF INVENTION

The present invention relates to a farm vehicle for carrying out agricultural work, such as market gardening.

BACKGROUND

In market gardening, the soil is still worked with manual implements. For the most part, the person using these implements is usually crouching or kneeling on the soil. This work is repetitive and tiring because the soil has to be prepared after it has been tilled. This includes hoeing, planting, weeding, and harvesting. Moreover, working the soil places the body in positions that are unpleasant. Such positions can cause pain and may, in the long term, result in pathological states, notably in the knees or the back.

SUMMARY

One of the objects of the present invention is an improved farm vehicle that can also reduce the strenuousness of work on the soil because of the working posture that the agricultural worker may adopt.

For this purpose, the invention features a traveling farm vehicle having at least one seat that can be converted between at least one sitting position and a kneeling work-position. Such a seat includes a cushion for supporting the chest and head, a cushion for supporting the knees in the kneeling work-position, and a central cushion pivoting transversely between a lowered position for supporting the pelvis in the kneeling work-position and a raised position for the sitting part in the sitting position.

The farm vehicle can also include a supporting slide-way structure that allows at least one translational movement of the seat either in the direction of the vehicle's travel or in a direction transverse to the direction of the vehicle's travel, or in both of these directions. The seat is mounted on a base of the farm vehicle. The base is mounted pivotably on the supporting slide-way structure to allow the three cushions to pivot about a vertical pivot axis of the farm vehicle.

The user may therefore work on the soil in a kneeling position with support for his chest, head, hips, and knees in a position similar to a prone position. In this position, the user has a large radius of action for his hands on the soil. This provides greater working comfort than crouching or kneeling on the soil. It also allows considerable flexibility of movement because of the three movable supports of the seat. The three supports, located at the head, the pelvis, and the legs, provide a comfortable position for the user. The cushions' mobility optimizes the user's position for the nature of the work to be done.

Embodiments include those in which the farm vehicle comprises a chassis frame on which the supporting slide-way structure is mounted. Among these are embodiments in which the chassis is mounted so as to be movable by vertical translation between a lowered position close to the soil and a raised position. The lowered position enables the user to work as closely to the soil as possible. The raised position enables the plants to be reached more easily, thus making it easier to pick carefully. The kneeling user can thus move vertically by moving the assembly comprising the seat. This arrangement being simpler, more economical, and more flexible than those that require shaping the soil to adapt it to the vehicle, for example by raising the soil between the wheel tracks.

In some embodiments, the central cushion inclines at an angle $\gamma$ of between 50° and 90° to the horizontal to change from a horizontal raised position to a lowered pelvic support position. In the lowered pelvic support position, the central cushion supports the user's hips by matching the natural shape of the hip joint, the hip being substantially bent as in the "all fours" position. This position protects the user's spinal column and improves his work posture.

In some embodiments, the base comprises a tube for supporting the central cushion. This tube has a vertical first part aligned with the vertical pivot axis and an inclined second part that carries the central cushion. In the lowered pelvic support position, the central cushion bears against the inclined second part, thereby reinforcing the pelvic support.

The cushion for supporting the knees in the kneeling work-position and the central cushion are fixed together. The cushion for supporting the knees pivots transversely between a raised position for supporting the knees in the kneeling position and a position for supporting the back in the sitting position.

In some embodiments, the angle $\alpha$ between the support surface of the knee support cushion and the support surface of the central cushion in the lowered pelvic support position is between 100° and 140°.

In other embodiments, the knee support cushion has a rounded and inclined edge that forms a hollow for supporting the user's knees.

In yet other embodiments, the chest and head support cushion can be turned over between the kneeling work-position and the sitting position.

Other embodiments include those in which the chest and head support cushion is fastened removably to the base, those in which the chest and head support cushion is mounted to be transversely pivotable, those in which the chest and head support cushion comprises a head support part supporting the user's forehead in the kneeling work-position, in which part a through hole is made to enable the user to see the soil.

In other embodiments, the chest and head support cushion comprises a head-support part and a chest-support part. The chest-support part has two wings that extent in a V shape. The point of the V is fixed to the head-support part to support the user's thorax in the kneeling work-position. The V shape avoids compressing the user's lungs and provides two lateral cut-outs, on each side of the user's neck for free movement of his arms. This particular shape enables the top of the user's chest to be supported without creating rigidity in his posture.

In some embodiments, the base comprises first and second tubes. The first tube supports the head cushion. It at least one means for morphological adjustment in length and has one end joined to the chest and head support cushion. The second tube supports the central cushion. This second tube has at least one means for morphological height-adjustment as well as one end that is joined to the central cushion.

BRIEF DESCRIPTION OF THE DRAWINGS

Other advantages and characteristics will be apparent from a perusal of the description of a non-limiting example of embodiment of the invention, and from the attached drawings, in which:

FIG. 1 shows a schematic side view of a farm vehicle used in the kneeling work-position, FIG. 2 shows a view of the farm vehicle of FIG. 1 with the user in the sitting position, FIG. 3 is a view, similar to that of FIG. 2, with another example of a seat in a sitting position, FIG. 4 shows an example of a vehicle with two seats, FIG. 5*a* shows an example of a seat with the central cushion in a horizontal raised position, FIG. 5*b* shows the seat of FIG. 5*a* with the central cushion in a lowered pelvic support position.

DETAILED DESCRIPTION

Figure 6:
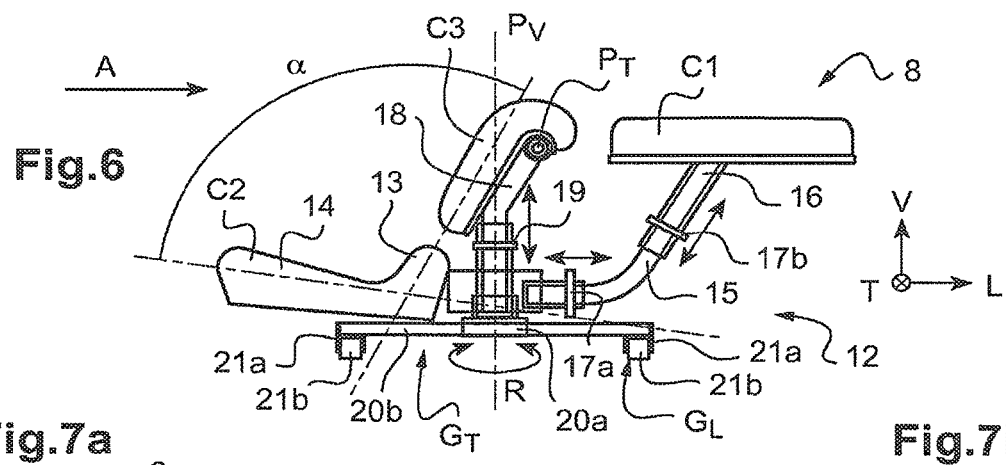
FIG. 6 shows a schematic side view of a seat in a kneeling work-position.

FIGS. 1, 2 and 3 show a traveling farm vehicle 1 used for carrying out agricultural work such as market gardening work. The farm vehicle's direction-of-travel A is the longitudinal direction L, as shown in FIG. 1. A transverse direction T is a direction perpendicular to the longitudinal direction L. FIG. 2 defines a non-limiting coordinate system (L, V, T) that is fixed relative to the farm vehicle 1. The horizontal plane corresponds to the longitudinal/transverse plane (L, T).

The vehicle 1 comprises a rectangular and metal chassis frame 2 without a floor passing over soil 4. The vehicle 1 also comprises at least three or four wheels 3 that are joined to the chassis frame 2. In some embodiments, a front wheel 3 is pivoted so that the vehicle 1 can be steered.

The vehicle 1 includes various optional accessories and/or may support one or more crates 5 that are, for example, carried at the front and rear of the vehicle 1 for storing the products harvested or plants to be planted. The vehicle 1 may also be equipped with a canopy 6 to protect the user 7 from sun or rain.

Preferably, the vehicle 1 is motorized. A suitable motor is an electric motor for rotating powered wheels and a battery for supplying energy to the electric motor. The electric motor is located, for example, to the rear of the chassis frame 2. This position retains the open structure of the chassis 2. Some embodiments also feature solar panels placed on the canopy 6 for recharging the battery by conversion of solar radiation to electrical energy.

Referring to FIG. 3, the farm vehicle 1 comprises one or more seats 8 mounted on the chassis frame 2, for in tandem side-by-side in the transverse direction T so that more than one user 7 at a time can work. Each user 7 works on his own cultivation row on the soil 4. An example of an arrangement of two tandem seats 8 is shown in FIG. 4.

The seat 8 can be converted between at least one sitting position, as shown in FIGS. 2 and 3, in which the user 7 is seated, and a kneeling work-position, shown in FIG. 1, in which the user 7 is practically prone with his hips and knees slightly bent in the "all-fours" position, the chest, the head, the hips and the knees being supported.

In the kneeling work-position shown in FIG. 1, the user 7 is substantially positioned in the center of the chassis frame 2 in the vehicle's direction-of-travel A. The soil 4 is easily accessible to the user's hands through the chassis frame 2, as shown in FIGS. 7*a*-7*d*.

This position is particularly useful for performing agricultural work on the soil 4, such as weeding, planting, sowing or harvesting, since it causes less fatigue and strain on the back and knees.

The sitting position enables the farm vehicle 1 to be used for other types of agricultural work, or facilitates the prolonged driving of the vehicle 1.

For this purpose, the seat 8 comprises a chest-and-head-support cushion C1, a knee-support cushion C2 for supporting the knees in the kneeling work-position, and a central cushion C3.

The central cushion C3 is mounted to be pivotable transversely between a lowered pelvic-support position, which is visible in FIGS. 1 and 5*b*, and a horizontal raised-position so that the user 7 can be seated in the sitting position, as shown in FIGS. 2, 3 and 5*a*. In the sitting position, the central cushion forms the sitting part of the seat. In the kneeling work-position, the central cushion is located, with reference to the longitudinal direction, between the knee-support cushion C2 and the chest-and-head-support cushion C1.

The three cushions C1, C2, C3 of the seat 8 are mounted on a base 15 of the vehicle 1.

Figure 7A:
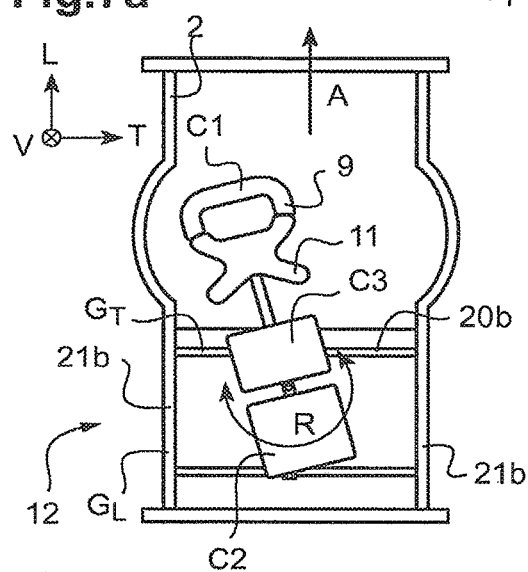
FIG. 7*a* shows a top view of FIG. 6 in which the seat has pivoted through about twenty degrees in the counterclockwise direction relative to the vehicle's direction-of-travel.
Figure 7B:
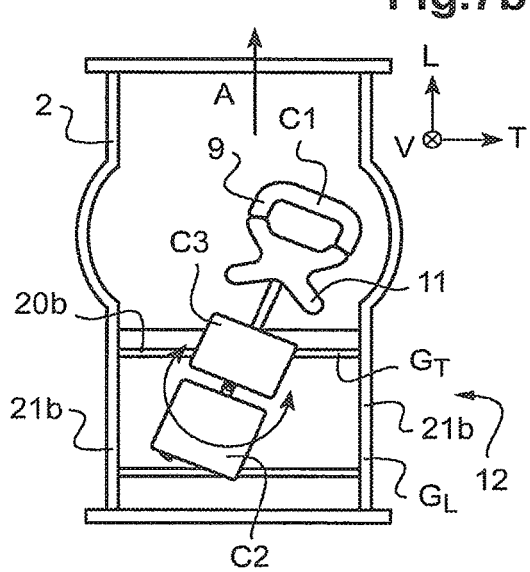
FIG. 7*b* shows a view similar to that of FIG. 7*a*, in which the seat has pivoted through about twenty degrees in the clockwise direction relative to the vehicle's direction-of-travel.
Figure 7C:
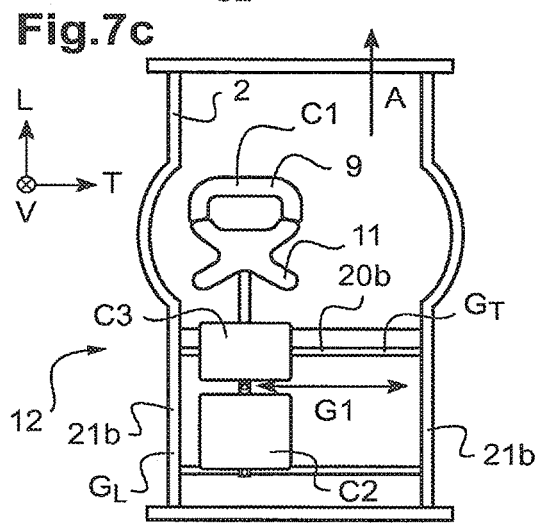
FIG. 7*c* shows a view similar to that of FIG. 7*a*, the seat having been translated in the in the direction transverse to the vehicle's direction-of-travel.
Figure 7D:
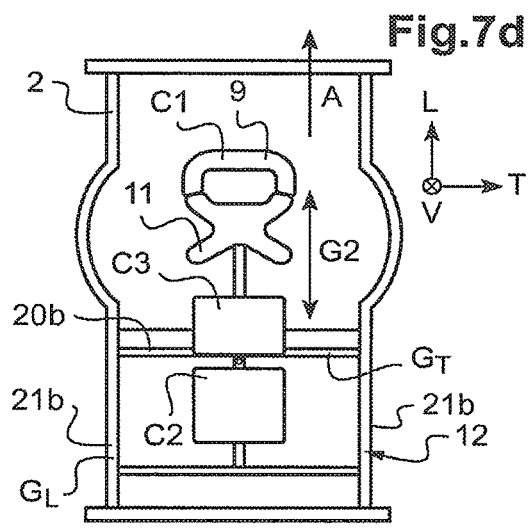
FIG. 7*d* shows a view similar to that of FIG. 7*a*, the seat having been translated in the vehicle's direction-of-travel.

The farm vehicle 1 further comprises a supporting slide-way structure 12, mounted on the chassis frame 2 to allow at least one translational movement of the seat 8 either in the vehicle's direction-of-travel A, as shown in FIG. 7*d*, or in a transverse direction T, as shown in FIG. 7*c*, or in both the vehicle's direction-of-travel A and in the transverse direction T.

The chassis frame 2 may also be mounted to be able to translate vertically. Such movement would be enabled by actuators that have been omitted from the drawings for clarity. Vertical translation between a lowered and a raised position allows the assembly comprising the seat 8 to be raised or lowered along a path C, as shown in FIG. 3. In some embodiments, the path extends between 30 and 70 centimeters. A particularly useful path length is on the order of 50 centimeters.

In some embodiments, the vehicle 1 has vertical guide rails for the vertical movement of the chassis frame 2. These can be arranged at the front and rear of the vehicle 1.

The seat 8 may thus assume a lowered kneeling work-position, as shown in FIG. 1, a raised sitting position, as shown in FIG. 3, a lowered sitting position, as shown in FIG. 2, or a raised kneeling work-position, which is not shown.

The seat's ability to transition between positions enables the user 7 to work in a kneeling work-position as closely to the soil 4 as possible, or in a raised kneeling work-position to enable the plants to be reached more easily so that the user 7 can pick more carefully. The user 7 in the kneeling work-position can thus move vertically in height by moving the assembly comprising the seat 8. This arrangement is much simpler, more economical, and more flexible than having to shape the soil to adapt it to the vehicle 1 by raising the soil 4 between the tracks of the wheels 3.

The base 15 is mounted pivotably on the supporting slide-way structure 12 to enable the three cushions C1, C2, C3 to pivot about a vertical pivot axis PV of the farm vehicle 1, for example through about thirty degrees on either side of the vehicle's direction-of-travel A. Thus, in FIG. 7*a*, the seat 8 has pivoted through about twenty degrees in the anticlockwise direction, while in FIG. 7b it has pivoted through about twenty degrees in the clockwise direction, relative to the vehicle's direction-of-travel A.

According to an exemplary embodiment shown more fully in FIG. 6, the base 15 comprises a tube for supporting the central cushion 18, this tube having a vertical first part aligned with the vertical pivot axis PV, enabling the three cushions C1, C2, C3 to pivot, and an inclined second part carrying the central cushion C3 at its end.

The central cushion C3 is articulated about a transverse pivot axis PT that is, for example, joined to a front end of the central cushion C3 along a transverse edge, partially surrounding the transverse pivot axis PT, as shown in FIGS. 5a, 5b and 6. The transverse pivot axis PT is parallel to the transverse direction T and preferably parallel to the chassis frame 2.

In the kneeling work-position shown in FIGS. 5b and 6, the central cushion C3 is inclined in a lowered pelvic support position.

The central cushion C3 is inclined, for example, at an angle γ of between 50° and 90° to the horizontal, such as an angle of the order of 60°, so as to change from a horizontal raised position to the lowered pelvic support position, as shown in FIG. 5b. In the lowered pelvic support position, the central cushion C3 supports the hips of the user 7 by matching the natural shape of the hip joint, which is substantially bent as in the "all fours" position. This position enables the spinal column of the user 7 to be protected, improving his work posture. The movement of the central cushion C3 between the sitting position and the kneeling work-position can be seen by comparing FIGS. 5a and 5b.

According to an example of embodiment, in the lowered pelvic support position, the central cushion C3 bears against the inclined second part of the tube for supporting the central cushion 18, thereby reinforcing the pelvic support. The inclined second part of the tube for supporting the central cushion 18 is then inclined at the same angle as the angle γ of inclination of the central cushion C3.

In some embodiments, the tube for supporting the central cushion 18 includes at least one means for morphological adjustment in height 19 for adjusting the height of the central cushion C3. In some embodiments, the tube for supporting the central cushion 18 comprises a sleeve tube and a tube that can be inserted into the sleeve tube. One implementation of the morphological height adjustment means 19 includes pins that are placed through holes formed transversely along the sleeve and tube.

In some embodiments, the chest-and-head support-cushion C1 comprises a head-support part 9 supporting the forehead of the user 7 in the kneeling work-position. A through hole 10 formed in the head support part 9 enables a user 7 who has assumed a kneeling position to see the soil 4.

In some embodiments, the chest-and-head support-cushion C1 includes a chest-support part 11. This chest-support part 11 comprises, for example, two wings 11a, 11b that extend to define a "V," as shown in FIG. 5a. The V's point is fixed to the head-support part 9 to support the user's thorax 7 in the kneeling work-position. The chest-support part 11 extending the head support part 9 can be made in one piece or in two pieces joined by morphological adjustment means. The V shape avoids compressing the user's lungs, and provides two lateral cut-outs on each side of the user's neck for free movement of his arms. This particular shape supports the top of the user's chest without creating rigidity in his posture.

The base 15 comprises a tube 16 for supporting the head cushion. The tube 16 extends substantially in the vehicle's direction-of-travel A. One end of the tube carries the chest-and-head support-cushion C1. In some embodiments, the tube 16 for supporting the head cushion curves upward. In other embodiments, the tube 16 has at least one means for morphological adjustment in length 17a, 17b for adjusting the distance between the tube's base and the chest-and-head support-cushion C1. In some embodiments, two length adjustment means 17a, 17b are provided, before and after the curved area of the head-cushion support tube 16.

In some embodiments, the tube 16 for supporting the head cushion comprises at least one sleeve tube and a tube that is insertable into the sleeve tube. The morphological length adjustment means 17a, 17b is, for example, provided by placing pins through holes formed transversely along the sleeve and the insertable tubes.

The knee-support cushion C2 in the kneeling work-position of the user 7 may have a rounded and inclined edge 13 forming a hollow for the user's knees, which are substantially bent in the kneeling work-position. The rounded edge 13 is arranged in the prolongation of a support surface 14 of the cushion C2 for supporting the legs.

According to one embodiment, the knee-support cushion C2 in the prone work position and the central cushion C3 are fixed together, the knee-support cushion C2 pivoting transversely with the central cushion C3 through an angle α between a position for supporting the knees in the kneeling work-position and a position for supporting the back in the sitting position. The farm vehicle 1 is then suitable for prolonged use in the sitting position, such as that required for use by arboriculturists, nurserymen, or winegrowers.

For example, provision may be made for the angle α between the support surface 14 of the knee support cushion C2 and the support surface of the central cushion C3 in the lowered pelvic support position to be between 100° and 140°, for example on the order of 120°.

The chest-and-head support-cushion C1 can be turned over between the kneeling work-position *** and the sitting position, so as to free the space for the knees of the user 7.

According to a first example of embodiment visible in FIG. 2, the chest-and-head support-cushion C1 is fastened removably to the base 15. The chest-and-head support cushion C1 may then be removed for the use of the farm vehicle 1 in the sitting position. The chest and head support cushion C1 may, for example, be removed by withdrawing the pin of the length adjustment means 17b or 17a, thus releasing the insertable tube carrying the chest and head support cushion C1.

According to a second example of embodiment visible in FIG. 3, the chest-and-head support-cushion C1 is mounted to be transversely pivotable, thus facilitating the conversion of the seat 8. The chest-and-head support-cushion C1 is, for example, articulated about an additional transverse pivot axis PTb, for example along a mid-line of the chest-and-head support-cushion C1. The chest-and-head support-cushion C1 is inclined, for example, at an angle β of between 30° and 90°, such as an angle of the order of 60°, so as to change from the horizontal position in the kneeling work-position, shown in FIG. 1, to the turned-over position in the sitting position, shown in FIG. 3.

Referring to FIGS. 7a-7d, an exemplary embodiment of the supporting slide-way structure 12 comprises a longitudinal slide-way GL, allowing a translational movement of the seat 8 in the vehicle's direction-of-travel A, and a transverse slide-way GT, allowing a translational movement of the seat in the transverse direction T. The transverse slide-way GT is perpendicular to the longitudinal slide-way GL.

In some embodiments, the transverse slide-way GT surmounts the longitudinal slide-way GL and carries the pivot of the seat's base 15. The transverse slide-way GT makes it possible, notably, to shift the seat 8 to one side in order to arrange two or three seats 8 side-by-side. The transverse slide-way GT comprises, for example, a rib sliding in a transverse guide rail, or two tubes 20*a*, 20*b* sliding in one another, extending in the transverse direction T, one of the tubes 20*a* being joined to the pivot of the base 15 of the seat 8. The longitudinal slide-way GL comprises, for example, two ribs, each sliding in a respective longitudinal guide rail, or sets of two tubes 21*a*, 21*b* sliding in one another, extending in the vehicle's direction-of-travel A, on each side of the seat 8. For each set of two tubes 21*a*, 21*b*, one tube 21*b* is carried by the chassis frame 2 and the other 21*a* may be fastened to the same transverse tube, such as the tube 20*b* of the transverse slide-way GT.

In some embodiments, the farm vehicle 1 includes positional locking means. These positional locking means may enable one or more translational movements to be locked while leaving the seat 8 free to pivot so that it may easily be operated by the force imparted by the user 7 in the kneeling work-position. In some embodiments, the positional locking means enable the transverse translational movement to be locked while leaving the seat 8 free to pivot about the vertical pivot axis PV and leaving the longitudinal translational movement free. Implementations of the positional locking means include a locking lever or shoes that can be actuated by the user 7 in a kneeling work-position.

In operation, the user 7 in a kneeling work-position can easily pivot about the vertical pivot axis PV along the arrow R shown in FIGS. 7*a* and 7*b* and translate along the transverse direction T as shown by the arrow G1 in FIG. 7*c* and/or along the vehicle's direction-of-travel A, as shown by the arrow G2 in FIG. 7*b*.

The user 7 can therefore work on the soil 4 in a kneeling position with support for his chest, head, hips and knees, while enjoying a large radius of action of the hands on the soil 4. This provides greater working comfort than crouching or kneeling positions on the soil 4 while allowing high flexibility of movement because of the three movable supports of the seat 8. The three supports, located at the head, the pelvis, and the legs, provide a comfortable position for the user 7, and the mobility of the cushions C1, C2, C3 enables the position of the user 7 to be adapted in the best way to the nature of the work to be done.

Having described the invention, and a preferred embodiment thereof, what we claim as new, and secured by Letters Patent is:

1. An apparatus comprising a traveling farm vehicle, said farm vehicle comprising a seat, a base, and a slide-way, wherein said seat is convertible between a sitting position and a kneeling position, said kneeling position being a working position, wherein said seat comprises a first cushion, a second cushion, a third cushion, wherein said first cushion supports a user's chest and head, wherein said second cushion supports a user's knees when said seat is in said kneeling position, and wherein said third cushion is a central cushion that pivots transversely between a lowered position and a raised position, wherein in said lower position, said third cushion supports said user's pelvis in said kneeling position, and wherein, in said raised position, said third cushion forms a sitting part in a sitting position, wherein said slide-way comprises a supporting slide-way, wherein said slide-way allows translation of said seat in a direction of travel, wherein said direction of travel is selected from the group consisting of travel along any combination of a first direction and a second direction transverse to said first direction, said first direction being a direction of travel of said vehicle, wherein said seat is mounted on said base, wherein said base is mounted to pivot on said slide-way to allow said first, second, and third cushions to pivot about a vertical pivot axis of said farm vehicle.

2. The apparatus of claim 1, further comprising a chassis frame, wherein said slide-way is mounted on said chassis frame.

3. The apparatus of claim 2, wherein said chassis frame is mounted to be translated vertically between a lowered position and a raised position.

4. The apparatus of claim 1, wherein said third cushion is configured to incline at an angle of between 50° and 90° to horizontal, wherein said third cushion transitions between a horizontal raised configuration and a lowered pelvic support position whereby said seat transitions between said sitting position and said kneeling position.

5. The apparatus of claim 4, wherein said base comprises a tube for supporting said third cushion, said tube having a vertical first part aligned with said vertical pivot axis and an inclined second part carrying said third cushion.

6. The apparatus of claim 5, wherein, in said lowered pelvic support configuration, said third cushion bears against said inclined second part.

7. The apparatus of claim 1, wherein said second cushion and said third cushion are fixed together, wherein said second cushion is configured to pivot transversely between a position for supporting said knees of said user in said kneeling position and a position for supporting said back of the user in the sitting position.

8. The apparatus of claim 1, wherein an angle between a support surface of said second cushion and a support surface of said third cushion, in a lowered pelvic support position, is between 100° and 140°.

9. The apparatus of claim 1, wherein said first cushion is fastened removably to said base.

10. The apparatus of claim 1, wherein said first cushion is mounted to be transversely pivotable.

11. The apparatus of claim 1, wherein said first cushion comprises a head-support part and a chest-support part, wherein said chest-support part comprises two wings extending to define a "V,", said "V" having a point that is fixed to said head-support part in order to support a thorax of said user in said kneeling position.

12. The apparatus of claim 1, wherein an angle between a support surface of said second cushion and a support surface of said third cushion, in said lowered pelvic support position, is between 100° and 140°.

* * * * *